US006619701B1

(12) United States Patent
Udhofer

(10) Patent No.: US 6,619,701 B1
(45) Date of Patent: Sep. 16, 2003

(54) CONNECTION OF A METAL PIPE WITH A METAL SLEEVE

(75) Inventor: Andreas Udhofer, Gutersloh (DE)

(73) Assignee: Parker-Hannifan plc, Bielefeld (DE)

( * ) Notice: Subject to any disclaimer, the term of this patent is extended or adjusted under 35 U.S.C. 154(b) by 0 days.

(21) Appl. No.: 09/151,197

(22) Filed: Sep. 10, 1998

(30) Foreign Application Priority Data

Sep. 12, 1997 (DE) .......................................... 197 40 144

(51) Int. Cl.$^7$ ................................................ F16L 13/14
(52) U.S. Cl. ..................... 285/382.2; 285/382; 285/256
(58) Field of Search ............................. 285/382, 382.2, 285/382.1, 381.3, 328, 259, 256

(56) References Cited

U.S. PATENT DOCUMENTS

| 2,583,956 | A | * | 1/1952 | Lindsay et al. | |
|---|---|---|---|---|---|
| 2,848,254 | A | * | 8/1958 | Miller | |
| 3,397,901 | A | * | 8/1968 | Larrivee | 285/420 |
| 3,498,648 | A | * | 3/1970 | Hallesy | 285/382.2 |
| 4,431,031 | A | * | 2/1984 | Ettlinger | 138/109 |
| 4,525,098 | A | * | 6/1985 | Krude et al. | 285/382 |
| 4,671,542 | A | * | 6/1987 | Juchnowski | 285/174 |
| 4,768,275 | A | * | 9/1988 | Schmitz | 285/382 |
| 4,951,978 | A | * | 8/1990 | Martin | 285/381.3 |
| 5,190,324 | A | * | 3/1993 | Bird et al. | 285/328 |
| 5,267,758 | A | * | 12/1993 | Shah et al. | 285/259 |
| 5,364,135 | A | * | 11/1994 | Anderson | 285/38 |
| 5,553,898 | A | * | 9/1996 | Rogers | 285/328 |
| 5,788,292 | A | * | 8/1998 | Körner et al. | 285/334.4 |
| 6,092,274 | A | * | 7/2000 | Foti | 29/520 |

FOREIGN PATENT DOCUMENTS

| FR | 1238027 | * | 6/1960 | ............. 285/382.2 |
|---|---|---|---|---|
| GB | 2032557 | * | 5/1980 | ............. 285/382.2 |

\* cited by examiner

*Primary Examiner*—Teri Pham Luu
(74) *Attorney, Agent, or Firm*—Christopher H. Hunter

(57) ABSTRACT

The invention relates to a connection of a metal pipe with a metal sleeve by means of cold-pressing deformation. The metal sleeve on its inside shell is provided with a pipe limit stop and the portion of the sleeve to be connected with the pipe end, along its inside shell, exhibits deformations before the pressing process. In one embodiment, the deformations of the inside shell of the metal sleeve are formed as ribs extending around the axis of the sleeve. The ribs on the inside shell of the metal sleeve are spaced at varying distance from each other. In another exemplary embodiment, the deformation of the inside shell of the sleeve has a convex curvature so that a frictionally-engaged connection is created after pressing.

30 Claims, 5 Drawing Sheets

CONNECTION OF A METAL PIPE WITH A METAL SLEEVE

RELATED CASES

The present application claims priority to German Patent Application Serial No. P 197 40 144.9; filed Sep. 12, 1997.

FIELD OF THE INVENTION

The invention relates to a connection of a metal pipe with a metal sleeve by means of cold-pressing deformation and a method for producing such a pipe connection.

BACKGROUND OF THE INVENTION

In the field of relatively high-pressure hose connections it is known to use double sleeves as connecting elements, with an outer sleeve and an inner sleeve connected at the end. The outer sleeve is provided with tooth-shaped, circumferentially extending ridges along its inner wall. For assembly with the end of a hose, the connecting element is pushed all the way onto the hose end and the outer shell is pressed onto the hose shell by means of an assembly device. The assembly device is a conical tool that comprises several segments and is axially shifted in an inner cone. Pressing the outer shell causes the teeth to penetrate the hose surface all the way to the metallic hose core. This connects the sleeve with the hose and provides a seal with the sleeve.

For a push-type connection of two metal pipes, EP 0 470 902 discloses the use of a sleeve provided with axial ribs along its inner wall. The sleeve is made of an alloy with shape memory effect. To connect two pipes, the sleeve is guided over the pipe ends and the shape memory effect is triggered by heat treatment, which causes the sleeve to shrink onto the pipe ends and thus to create a tight connection.

SUMMARY

The object of the present invention is to use cold-pressing deformation to create a pipe connection that represents a form-fit connection, provides a tight seal and high pressure resistance, offers a wide variety of connection possibilities with all readily available pipe connections, and can be produced inexpensively.

In the initially-mentioned connection of a metal pipe with a metal sleeve, this object is attained with a pipe limit stop on the inside shell of the metal sleeve and deformations on the inside shell of the portion of the sleeve that is to be connected with the pipe end. Cold-pressing deformation using appropriate pressure applied by an assembly tool causes these deformations to be pressed into the shell of the pipe and thus produces a tight connection between the pipe shell and sleeve.

In one embodiment of the invention, the deformations of the inside shell are formed as ribs disposed parallel to each other and extending circumferentially around the axis of the sleeve. When pressure is applied, the ribs and the pipe shell are deformed to produce a metallic connection. Hermetically-sealed spaces remain between the ribs so as to create a pressure-resistant and pressure-tight connection of a plurality of metal seals that are arranged one behind the other in the direction of the pipe axis.

In an advantageous modification of the invention, the deformations and/or axial ribs are spaced at varying distance from each other so that the hermetically-sealed spaces arranged one behind the other are also differently sized.

It is particularly advantageous if the inside wall of the sleeve is provided with a recess to receive a sealing ring to support the metallic seals and to enhance leakage protection. Such a recess is advantageously provided in front of the first rib of the sleeve in the area of the pipe limit stop to further enhance the resistance to pressure. An elastomer ring is a particularly suitable sealing element.

In a further modification of the invention, the deformations and ribs differ in height (i.e., radial projection) before assembly. During cold-pressing deformation, the deformations and ribs are pressed into the pipe shell at a different rate while being deformed at the same time to create a form-fit connection. This embodiment requires a continuously increasing force during the pressing process since an increasing number of ribs or deformations enter into the pressing range. Only when all deformations or ribs have been subjected to the pressing process, the force increases steeply which indicates that the assembly is complete.

In a further embodiment, the sleeve is provided with a tapered entry area, adjacent to which there is a plurality of deformations and/or ribs. This enhances assembly when the pipe is inserted into the sleeve. Significant, however, is the fact that the tapered entry area substantially dampens any oscillations transferred by the pipe.

In a further embodiment, the deformation of the inside shell of the sleeve is formed as a convex curvature to create a frictionally-engaged connection. To increase the coefficient of friction, the surface of the convex curvature is roughened.

To further increase the coefficient of friction, the surface of the convex curvature is coated with a microencapsulated adhesive. In a modification thereto, the inside surface of the sleeve may also be coated with a hard granulate.

In a still further embodiment, the metal sleeve is combined with a screwed pipe connection.

In principle, the connection according to the invention may be combined with any of the screwed pipe connection systems that are readily-available on the market.

According to the method for creating the pipe connection, the metal sleeve to be connected with the pipe end is pushed onto the pipe end up to the limit stop and then subjected to a compressive force such that the sleeve deformations and/or ribs are plastically deformed while causing the pipe to be deformed. For this purpose, commercially available hose presses may be used, but their working pressure must be correspondingly enhanced, or else special tool inserts must be used.

BRIEF DESCRIPTION OF THE DRAWINGS

The invention is further explained by means of the drawings, which show.

DETAILED DESCRIPTION OF THE PREFERRED EMBODIMENT

Figure 1A:
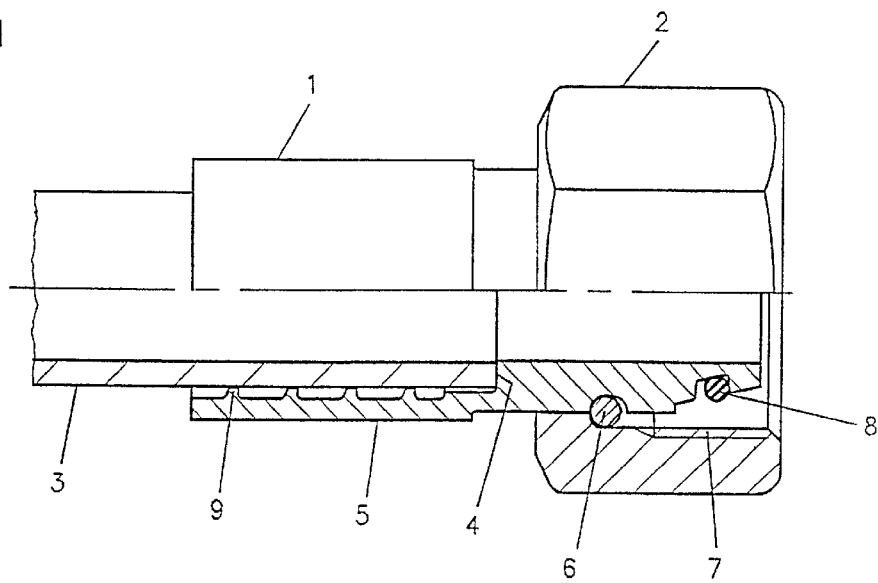
FIG. 1(a) is a side view and partial section of a sleeve with a screwed connection and a pipe end inserted in the sleeve.

FIG. 1a is a side view and partial section of a sleeve 1 with a screwed connection 2 and a pipe end 3 inserted in the sleeve. Pipe end 3 is inserted into metal sleeve 5 up to limit stop 4. Screwed connection 2 comprises a union nut that holds metal sleeve 5 via a circlip 6. Internal thread 7 of the union nut is connected with an external thread of a connecting element (not shown), whereby an O-ring 8 fits against the inside wall of the connecting element. Metal sleeve 5, in the area extending over pipe end 3, is provided with deformations comprising circumferentially-extending ribs 9. Ribs 9 are disposed parallel to each other and extend circumferentially around the axis of the sleeve.

Figure 1B:
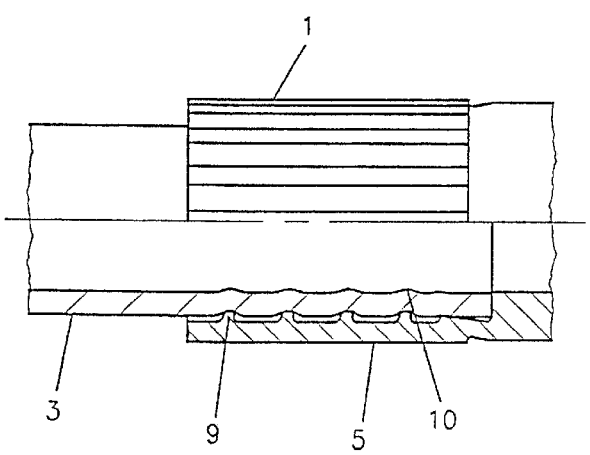
FIG. 1(b) is a schematic representation corresponding to FIG. 1(a) in the assembled state, without screwed connection.

FIG. 1b shows the pipe connection after cold-pressing deformation. Ribs 9 have been plastically deformed in such a way that they also caused a slight inner deformation of the pipe as indicated by reference number 10. The pressing process causes the spaces between ribs 9 to be hermetically sealed. The axial ribs 9 can be spaced at varying distance from each other so that the hermetically-sealed spaces arranged one behind the other are also differently sized.

Preferably, the metal sleeve 1 is pushed onto the pipe end 3 up to the limit stop 4 and then subjected to a compressive force such that the sleeve deformations are plastically deformed while causing the pipe to be deformed. For this purpose, commercially-available hose presses can be used at appropriate working pressures or with special tool inserts.

Figure 2:
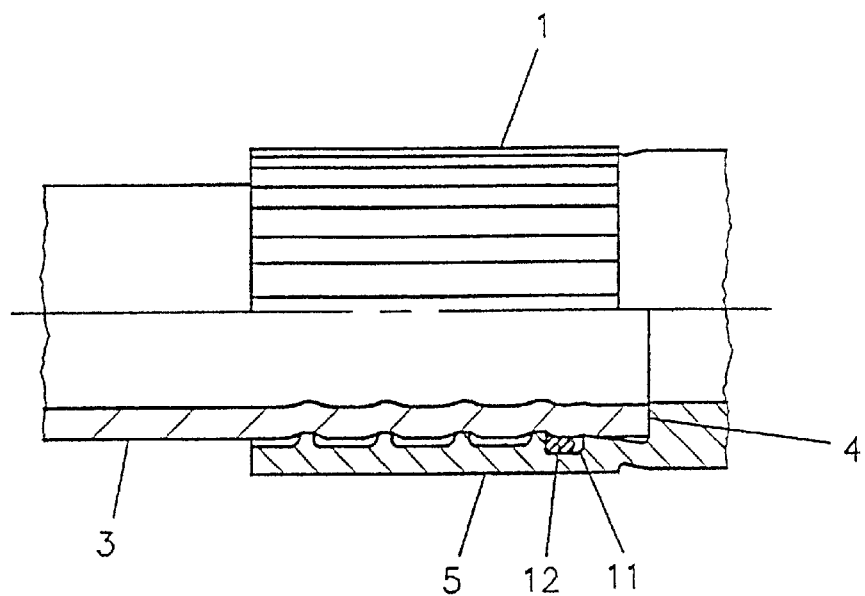
FIG. 2 is an embodiment according to FIG. 1 with added ring seal.

FIG. 2, similarly to FIG. 1b, shows a metal sleeve 5 connected with a pipe end 3 after cold-pressing deformation. In this embodiment, a groove 11 is located inside metal sleeve 5 to receive an elastomer gasket 12. Such a groove is advantageously provided in front of the first rib of the sleeve in the area of the pipe limit stop 4 to further enhance the resistance to pressure. Such a sleeve is assembled in the same manner as described above.

Figure 3A:
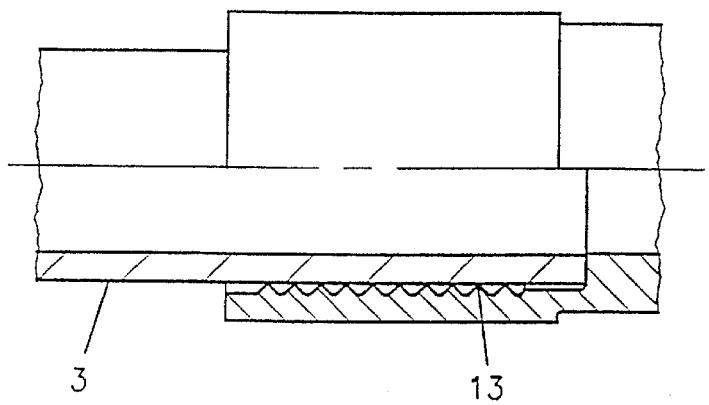
FIG. 3(a) is a modified embodiment according to FIG. 1(a) with densely arranged ribs in the inserted state.
Figure 3B:
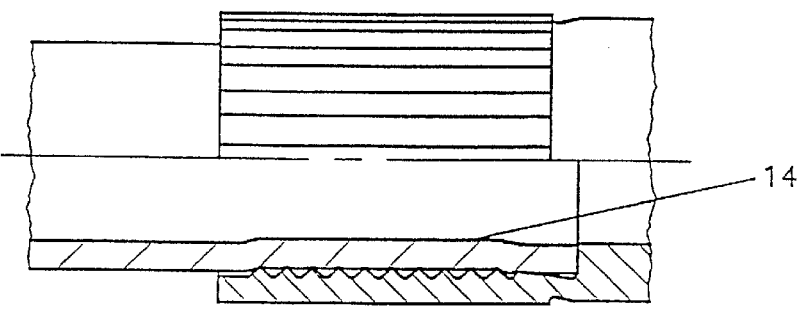
FIG. 3(b) is the embodiment shown in FIG. 3(a) in the assembled state after the pressing process.

FIG. 3a shows a modified embodiment according to FIG. 1a with densely arranged ribs 13 in the inserted state. The shape of the individual ribs 13 extends conically (in cross-section configuration) to the pipe shell. The large number of ribs 13 causes a continuous deformation 14 of inner pipe end 3 as shown in FIG. 3b rather than the wave-shaped deformation according to the embodiments shown in FIGS. 1b and 2. This has a positive effect on the flow resistance of the pipe. Such a sleeve is also assembled in the same manner as described above.

Figure 4A:
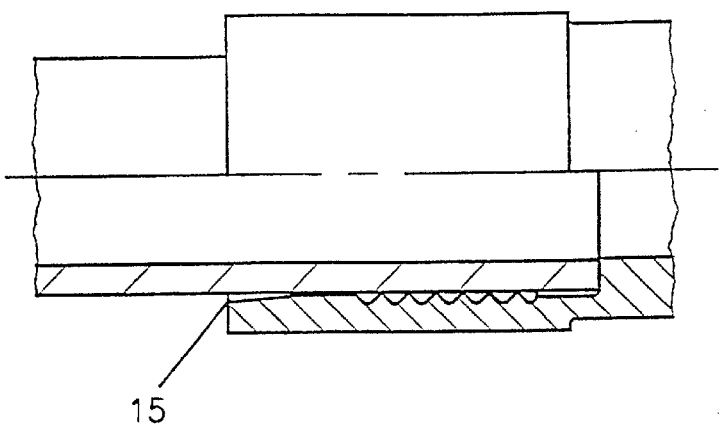
FIG. 4(a) is an additional embodiment with a conically-shaped opening of the sleeve in the inserted state.
Figure 4B:
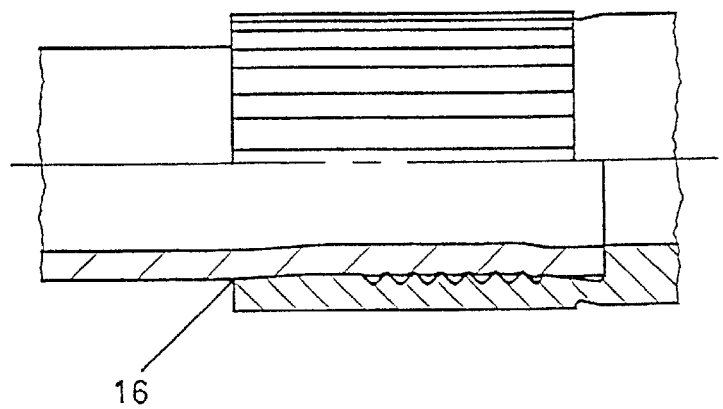
FIG. 4(b) is the embodiment shown in FIG. 4(a) in the assembled state after the pressing process.

FIG. 4a shows an additional embodiment according to the invention with a conically shaped opening 15 of sleeve 5 in the inserted state and FIG. 4b shows the same embodiment after cold-pressing deformation. This causes a deformation of the inner wall of the pipe end, which exhibits a slight gradient 16.

The conically extending entry area of metal sleeve 5 in the pre-assembled state enhances insertion of the pipe into the sleeve during assembly. After the cold-pressing deformation process, gradient 16 of the inside wall of metal sleeve 5 has the effect that any oscillations transferred by the pipe are substantially dampened by the conically extending entry area. Such a sleeve is also assembled in the same manner as described above.

Figure 5A:
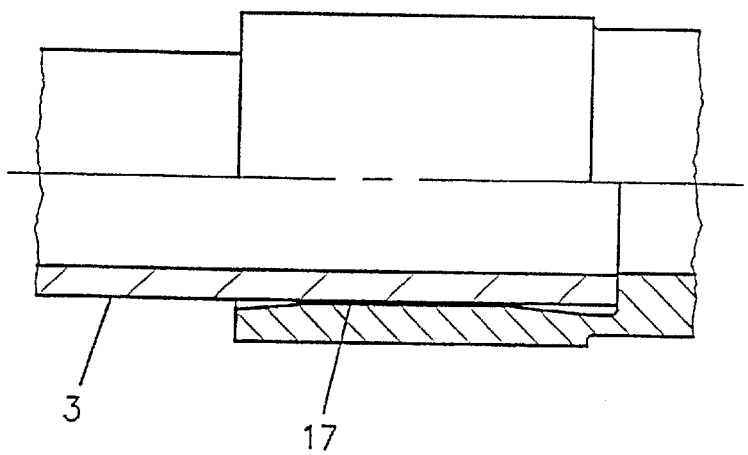
FIG. 5(a) is still another exemplary embodiment with a convex inside of the sleeve in the inserted state.
Figure 5B:
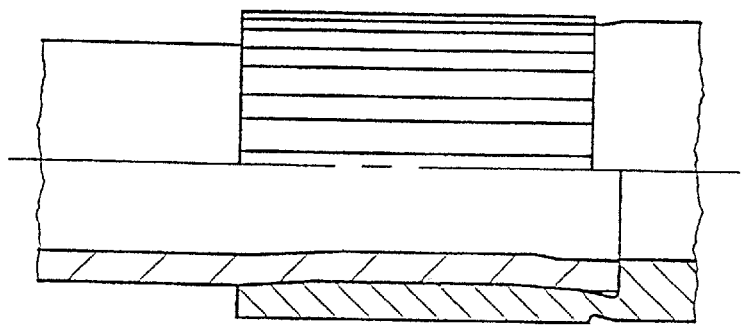
FIG. 5(b) is the embodiment shown in FIG. 5(a) in the assembled state.

FIGS. 5a and 5b show another deformation where the inside wall of the metal sleeve 5 has a convex shape before cold-pressing deformation. After the cold-pressing deformation process, the metal sleeve presses against the pipe shell and causes a convex curvature of the inside of the pipe. To increase the coefficient of friction, the surface of the convex curvature can be roughened.

To further increase the coefficient of friction, the surface of the convex curvature can also be coated with a microencapsulated adhesive. In a modification thereto, the inside surface of the sleeve may also be coated with a hard granulate. Such a sleeve is also assembled in the same manner as described above.

The deformations and ribs described in all the embodiments above above can also differ in height (i.e., radial projection) before assembly. During cold-pressing deformation, the deformations and ribs are pressed into the pipe shell at a different rate while being deformed at the same time to create a form-fit connection. This embodiment requires a continuously increasing force during the pressing process since an increasing number of ribs or deformations enter into the pressing range. Only when all deformations or ribs have been subjected to the pressing process, the force increases steeply which indicates that the assembly is complete.

In any case, with the above-described invention, a pipe connection is provided which is easily assembled, provides a safe and tight seal for extreme pressures, and thus satisfies many commercial requirements.

I claim:

1. A connection for an end of a metal pipe and a part of a metal sleeve by cold-pressing deformation, wherein the metal sleeve has a deformable inner shell with a pipe limit stop, and the part of sleeve to be connected with the pipe end includes a deformation on its inner shell before uniform pressing over its axial length, and that the sleeve is combined with a screwed connection that is freely-rotatable with respect to the metal sleeve, wherein the screwed connection comprises a union nut, the union nut having internal threads facing another part of the metal sleeve, the union nut including a receiving cavity for a connecting element, the receiving cavity disposed in surrounding relation to the other part of the metal sleeve, and further including an elastomeric O-ring disposed primarily in an annular recess around an outer circumferential surface of the other part of the metal sleeve.

2. The connection according to claim 1, wherein the deformation of the inner shell of the metal sleeve comprises ribs extending circumferentially around the axis of the sleeve.

3. The connection according to claim 2, wherein the ribs are spaced at varying distances from each other on the inner shell of the metal sleeve.

4. The connection according to claim 2, wherein the inner wall of the sleeve is provided with a recess to receive a first sealing element.

5. The connection according to claim 4, wherein the recess for receiving the first sealing element is disposed in front of a first rib on the inner wall of sleeve in the area of the pipe limit stop.

6. The connection according to claim 4, wherein the first sealing element is an elastomer ring.

7. The connection according to claim 2, wherein the ribs vary in height before pressing and, with cold deformation, are pressed into the shell of the pipe to create a form-fit connection.

8. The connection according to claim 1, wherein the sleeve has a tapered entry area and a plurality of deformations adjacent thereto.

9. The connection according to claim 1 wherein the deformation of the inside shell of the sleeve has a convex curvature so as to create a frictionally-engaged connection after pressing.

10. The connection according to claim 9, wherein the surface of the convex curvature is roughened to increase the coefficient of friction.

11. The connection according to claim 1, wherein the inside surface of the sleeve is coated with a microencapsulated adhesive or a hard granulate to increase the coefficient of friction.

12. The connection according to claim 1, wherein the inner wall of the sleeve is provided with a recess to receive a first sealing element.

13. The connection according to claim 12, wherein the first sealing element is an elastomer ring.

14. The connection according to claim 1, wherein the end of the metal pipe abuts the pipe limit stop.

15. The connection according to claim 14, wherein the union nut is retained on the metal sleeve by way of a clip.

16. A pipe connection, comprising: a deformable metal sleeve, a metal pipe received within a first end of said metal sleeve, and a threaded connection freely-rotatable received around a second end of said metal sleeve, said sleeve having an inner shell with an inwardly-projecting pipe limit stop, and a portion of the sleeve to be connected with the pipe includes an inwardly-projecting deformation on its inner shell, and wherein the sleeve is retained on the pipe by mechanically deforming the sleeve uniformly over the portion of the sleeve, wherein the threaded connection comprises a union nut, the union nut having internal threads facing a second end of the metal sleeve, the union nut including a receiving cavity for a connecting element, the receiving cavity disposed in surrounding relation to the second end of the metal sleeve, and further including an elastomeric O-ring disposed primarily in an annular recess around an outer circumferential surface of the second end of the metal sleeve.

17. The connection according to claim 16, wherein the deformation of the inner shell of the metal sleeve comprises ribs extending circumferentially around the axis of the sleeve.

18. The connection according to claim 17, wherein an inner wall of the sleeve is provided with a circumferentially-extending recess and a first sealing element is received in the recess.

19. The connection according to claim 18, wherein the recess for receiving the first sealing element is disposed between a first rib on the inner wall of sleeve and the pipe limit stop.

20. The connection according to claim 18, wherein the first sealing element is an elastomer ring.

21. The connection according to claim 17, wherein the ribs vary in height before deforming and are pressed into the shell of the pipe during deforming to create a form-fit connection.

22. The connection according to claim 17, wherein the ribs are spaced at varying axial distances from each other on the inner shell of the metal sleeve.

23. The connection according to claim 16, wherein the deformation of the inside shell of the sleeve has a convex curvature so as to create a frictionally-engaged connection after deforming.

24. The connection according to claim 23, wherein the surface of the convex curvature is roughened to increase the coefficient of friction.

25. The connection according to claim 23, wherein the inside surface of the sleeve is coated with a microencapsulated adhesive or a hard granulate to increase the coefficient of friction.

26. The connection according to claim 16, wherein the inner wall of the sleeve is provided with a recess to receive a first sealing element.

27. The connection according to claim 26, wherein the first sealing element is an elastomer ring.

28. The connection according to claim 16, wherein the sleeve has a tapered entry area for the pipe, and a plurality of inwardly-projecting deformations adjacent thereto.

29. The connection according to claim 16, wherein the end of the metal pipe abuts the pipe limit stop.

30. The connection according to claim 29, wherein the union nut is retained on the metal sleeve by way of a clip.

* * * * *